United States Patent
Garceau

(10) Patent No.: US 11,148,722 B2
(45) Date of Patent: Oct. 19, 2021

(54) ULTRA LIGHT TRAILER FRAME

(71) Applicant: NORCO INDUSTRIES, INC., Compton, CA (US)

(72) Inventor: Bernard F. Garceau, Vandalia, MI (US)

(73) Assignee: NORCO INDUSTRIES, INC., Compton, CA (US)

( * ) Notice: Subject to any disclaimer, the term of this patent is extended or adjusted under 35 U.S.C. 154(b) by 275 days.

(21) Appl. No.: 15/996,803

(22) Filed: Jun. 4, 2018

(65) Prior Publication Data

US 2018/0362092 A1 Dec. 20, 2018

Related U.S. Application Data

(60) Provisional application No. 62/514,362, filed on Jun. 2, 2017.

(51) Int. Cl.
| | |
|---|---|
| *B62D 21/20* | (2006.01) |
| *B62D 63/06* | (2006.01) |
| *B62D 29/04* | (2006.01) |
| *B62D 21/10* | (2006.01) |
| *B62D 29/00* | (2006.01) |

(52) U.S. Cl.
CPC ............ *B62D 21/20* (2013.01); *B62D 21/10* (2013.01); *B62D 29/04* (2013.01); *B62D 63/062* (2013.01); *B62D 29/001* (2013.01)

(58) Field of Classification Search
CPC ........ B62D 21/20; B62D 21/10; B62D 29/04; B62D 63/062; B62D 29/001
See application file for complete search history.

(56) References Cited

U.S. PATENT DOCUMENTS

| | | | | |
|---|---|---|---|---|
| 3,122,860 | A * | 3/1964 | Schulze ................. | B62D 33/04 52/309.11 |
| 3,579,942 | A * | 5/1971 | Cole ........................ | F16B 5/01 52/787.12 |
| 3,646,981 | A | 3/1972 | Barnes | |
| 4,078,348 | A * | 3/1978 | Rothman ................ | E04C 2/205 52/192 |

(Continued)

FOREIGN PATENT DOCUMENTS

| | | |
|---|---|---|
| DE | 102013109996 A1 | 12/2012 |
| WO | 2014121856 A1 | 8/2014 |

OTHER PUBLICATIONS

Hein Schellens and Ton Peijs, Design of a Multi-Functional Semi-trailer Using Structural Sandwich Panels, pp. 1-10, http://www.iccm-central.org/Proceedings/ICCM12proceedings/site/papers/pap1150.pdf.

*Primary Examiner* — Darlene P Condra
(74) *Attorney, Agent, or Firm* — Vorys, Sater, Seymour and Pease LLP; Scott M. Guttman

(57) ABSTRACT

A trailer frame is disclosed that comprises a panel with a plurality of inserts installed at certain hard point locations where external components and equipment may be attached. In one embodiment, the inserts are two-piece formed hard points, whereas in other embodiments, the inserts are one piece solid hard points. In some embodiments, the panel is a sandwich panel. The inserts may be installed in the panel in a variety of manners, for example, they may be set flush within shallow pockets machined or routed into the panel's outer skins. Also, brackets may be utilized to interconnect components or equipment to the hard point inserts.

24 Claims, 8 Drawing Sheets

(56) References Cited

U.S. PATENT DOCUMENTS

| | | | |
|---|---|---|---|
| 4,288,962 A * | 9/1981 | Kavanaugh | E04B 2/562 52/220.1 |
| 4,898,756 A | 2/1990 | Oefner | |
| 5,259,720 A * | 11/1993 | Lobner | B60P 3/062 104/46 |
| 6,055,790 A * | 5/2000 | Lunde | E04C 2/365 52/787.1 |
| 6,419,146 B1 | 7/2002 | Buldhaupt et al. | |
| 7,608,313 B2 | 10/2009 | Solomon et al. | |
| 7,877,960 B2 * | 2/2011 | Kennedy | B23K 33/00 52/800.1 |
| 7,980,165 B2 * | 7/2011 | Misencik | E04H 9/10 89/36.02 |
| 8,161,710 B2 * | 4/2012 | Elliott | E04B 2/7457 109/49.5 |
| 8,186,747 B2 | 5/2012 | Bloodworth et al. | |
| 8,596,018 B2 * | 12/2013 | Dagher | F41H 5/013 52/222 |
| 8,640,416 B2 * | 2/2014 | Cullen | E04B 1/0007 52/309.9 |
| 2002/0014302 A1 | 2/2002 | Fanucci et al. | |
| 2005/0093273 A1 * | 5/2005 | McDonell | B60D 1/155 280/656 |
| 2006/0269720 A1 * | 11/2006 | Guanci | E04C 2/36 428/72 |
| 2007/0180982 A1 * | 8/2007 | Dagher | F41H 5/013 89/36.02 |
| 2007/0216197 A1 | 9/2007 | Wuerfel, III | |
| 2008/0174147 A1 * | 7/2008 | Skaradzinski | B62D 33/048 296/181.3 |
| 2008/0211218 A1 * | 9/2008 | Booher | B62D 21/20 280/789 |
| 2009/0212533 A1 * | 8/2009 | Verhaeghe | B32B 5/18 280/423.1 |
| 2010/0021686 A1 | 1/2010 | Groussard et al. | |
| 2010/0090452 A1 * | 4/2010 | Verhaeghe | B32B 5/26 280/789 |
| 2011/0183104 A1 | 7/2011 | Juergens | |
| 2014/0141160 A1 * | 5/2014 | Strachan | B28B 1/29 427/209 |
| 2015/0298423 A1 * | 10/2015 | Holemans | B64C 1/12 244/133 |
| 2017/0297301 A1 * | 10/2017 | Mills | B32B 5/26 |

\* cited by examiner

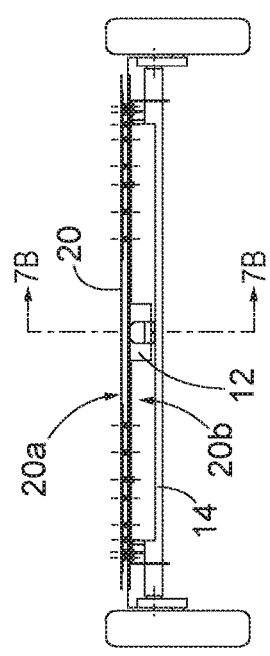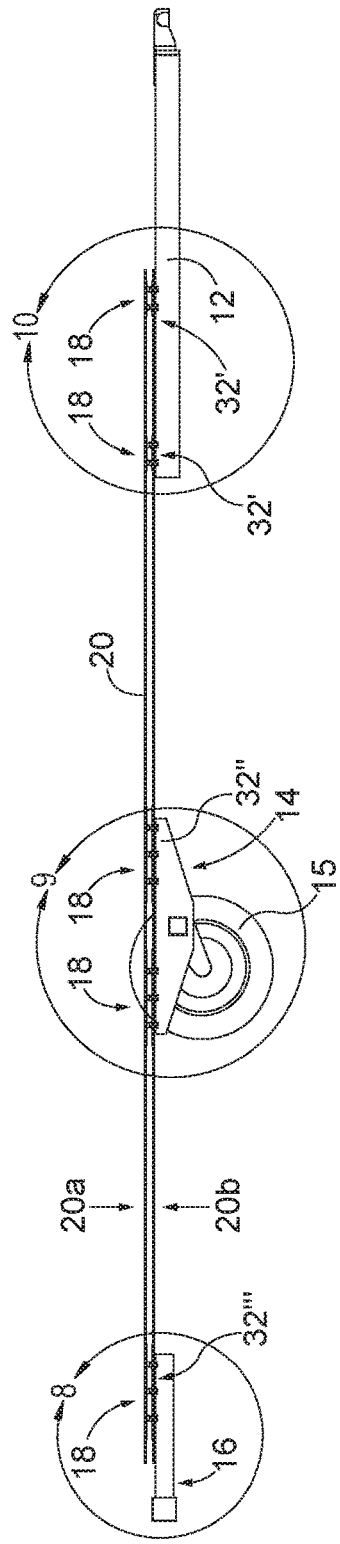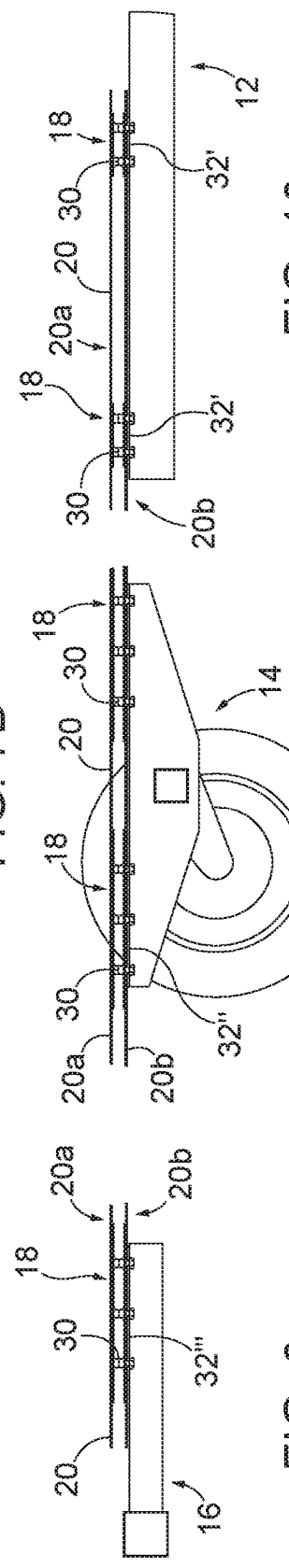

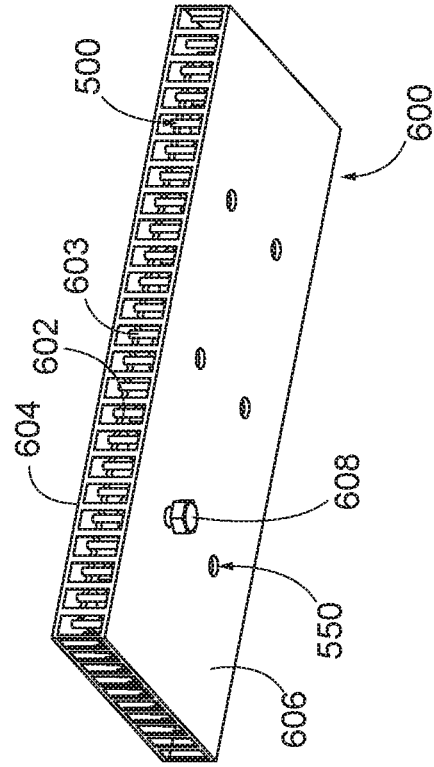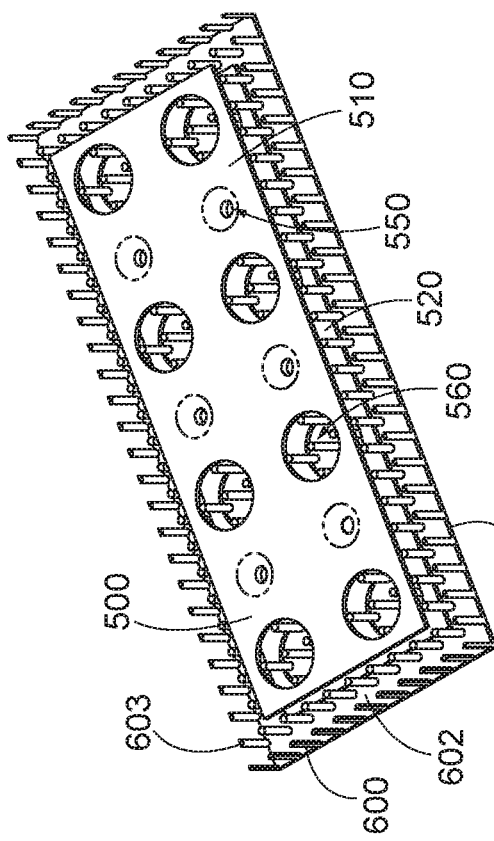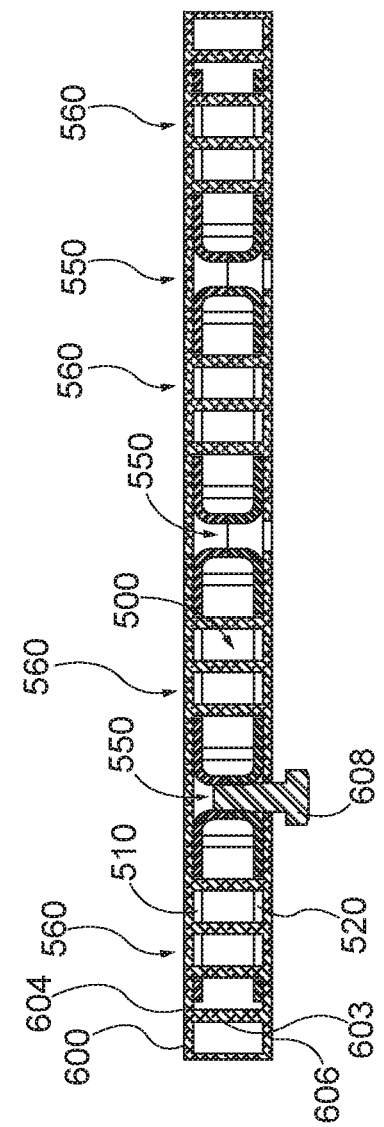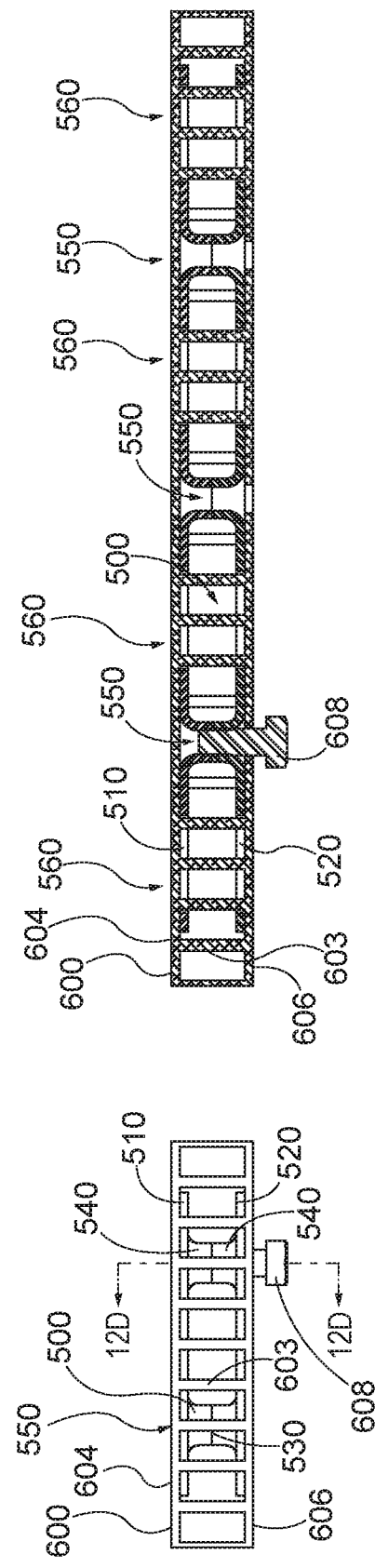

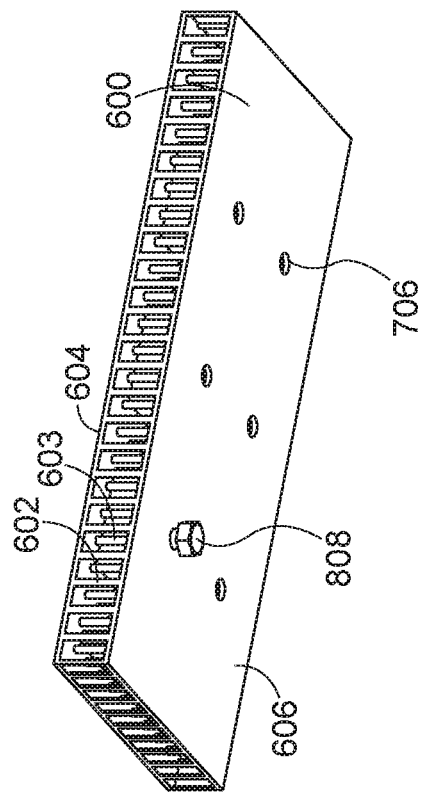
FIG. 14B
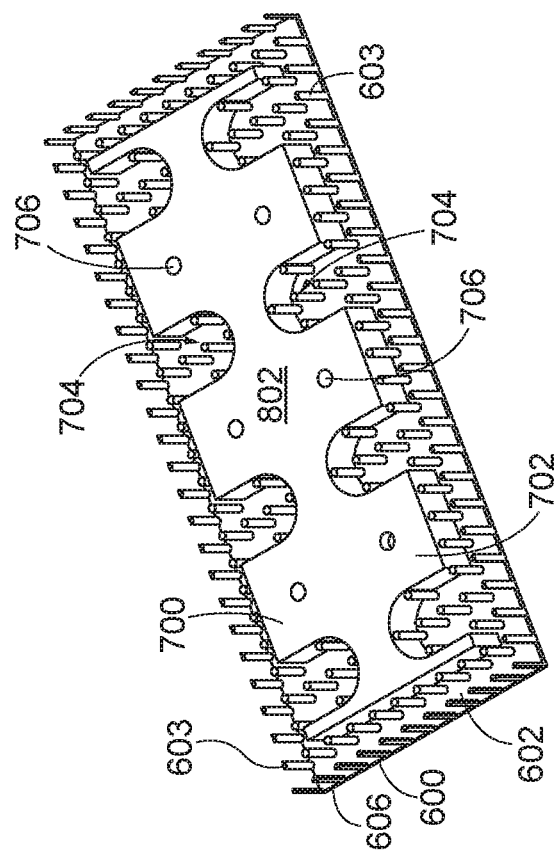
FIG. 14A
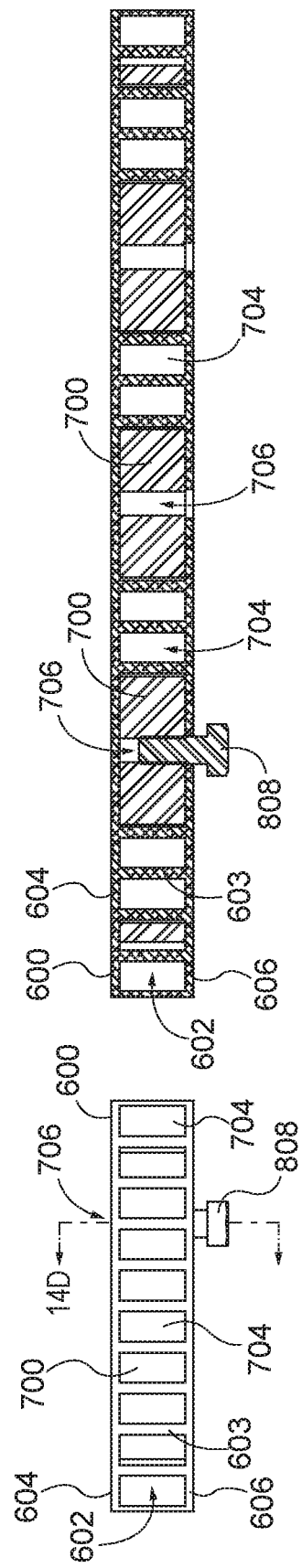
FIG. 14D
FIG. 14C

ULTRA LIGHT TRAILER FRAME

CROSS-REFERENCE TO RELATED APPLICATIONS

This application claims benefit of U.S. Provisional Application No. 62/514,362, filed Jun. 2, 2017, the disclosure of which is incorporated by reference in its entirety.

TECHNICAL FIELD

The present invention generally relates to trailer frames and, more particularly, to light-weight frames with integrated hard points. More particularly, the present invention relates to a light-weight trailer frame with hard points integrally formed therein for facilitating connection of hardware such as a suspension assembly, a bumper, a landing gear, an outrigger, etc.

BACKGROUND OF THE INVENTION

Trailer frames are typically manufactured by welding frame members together. Typical frame members include I-beam, flat, L-shape, U-shape or tubular rail sections. The frames generally have a ladder construction with axle units connected to the side frame members of the ladder near the center or rearward portion of the frame. These trailer frames are used for boat trailers, car trailers, recreational vehicles, horse trailers, utility trailers, and the like. These known frames, however, are constructed of steel or other metals and are therefore heavy. It is thus desirable to have a light-weight trailer frame to which trailer hardware and componentry may be connected.

SUMMARY OF THE INVENTION

The present invention generally relates to a trailer frame comprising a panel and a plurality of hard point locations. In some embodiments, the hard point locations are defined by one or more inserts installed within the panel, and these inserts may comprise, for example, formed inserts or solid inserts, or combinations thereof. In one embodiment, the panel is a sandwich panel and the hard point locations are defined by a plurality of formed insert hard points to which structures and/or equipment may be connected, for example, with a bracket. In some embodiments, the hard points are two-piece formed inserts, while solid one-piece inserts are utilized in other embodiments.

BRIEF DESCRIPTION OF THE DRAWINGS

FIG. 7A is a front view of the trailer frame of FIG. 1.

FIG. 7B is a cross-sectional side views along Section D-D in FIG. 7A, and FIGS. 8-10 are various detailed cross-sectional side views of FIG. 7B.

FIGS. 12A and 12B are, respectively, top and bottom isometric views the hard point insert of FIGS. 11C-11D when installed in an exemplary panel, according to one or more embodiments.

FIG. 12C is a side view of the hard point insert of FIGS. 11C-11D when installed in an exemplary panel, according to one or more embodiments.

FIG. 12D is a cross-sectional side view along Section A-A in FIG. 12C.

FIGS. 14A and 14B are, respectively, top and bottom isometric views the hard point insert of FIGS. 13A-13B when installed in an exemplary panel, according to one or more embodiments.

FIG. 14C is a side view of the hard point insert of FIGS. 13A-13B when installed in an exemplary panel, according to one or more embodiments.

FIG. 14D is a cross-sectional side view along Section A-A in FIG. 14C.

DETAILED DESCRIPTION OF THE INVENTION

Figure 1:
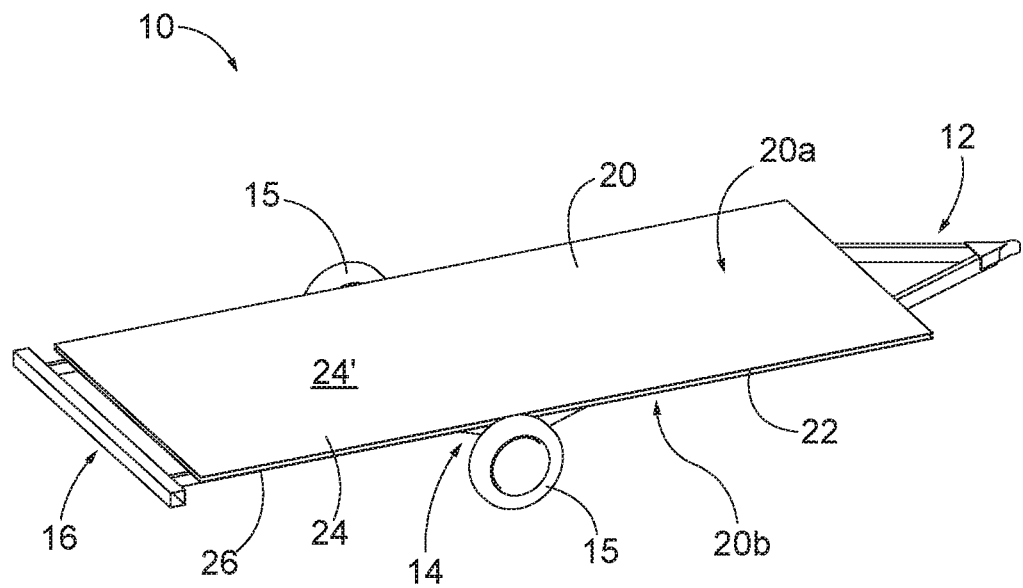
FIG. 1 is an isometric top view of a trailer frame according to one or more embodiments shown or described herein.

The accompanying figures depict a trailer frame 10 that is light-weight, which may hereinafter be referred to as either the trailer frame or the frame. The trailer frame may comprise at least one panel 20. In the illustrated embodiment, the panel 20 defines the floor of the trailer frame 10. In other embodiments, one or more additional panels 20 may be utilized to form other structures such as, for example, walls, ceilings, dividers, etc., without departing from the present disclosure, and in such embodiments the additional panels 20 may be similarly configured as described hereinafter. The trailer frame 10 may have various structures or other components secured thereto, for example, suspension assemblies, axle assemblies, kingpin assemblies, frames (e.g., A-Frames), bumper assemblies, coupler plates, outrigger assemblies, etc. In the illustrated embodiment, the trailer frame 10 includes a plurality of hard points 18 arranged at various locations on the top or bottom surface of the panel 20 for interconnecting the panel 20 to such structures or components. As described below, the hard points 18 may be configured to receive various types of anchors or fasteners for securing such structures or components to the panel 20, and, in some embodiments, for example, these anchors or fasteners are utilized to secure to the panel a mounting bracket or plate that in turn is connected to the structure or component. Accordingly, the hard points 18 locations may define one or more attachment points that are accessible from either or both of the top and bottom surfaces of the panel 20, where structures or components may be mounted directly (or indirectly, e.g., via a bracket) to such attachment points, for example, via a fastener, anchor, welding, etc. As described below, the attachment points may comprise channels or threaded holes that extend through an entire (or partial) thickness of an insert disposed within the panel 20 and that are configured to receive fasteners such as bolts, screws, etc. In other embodiments, the attachment points may comprise grooves or slots configured to receive a mating tab that may include a flanged portion for securing the mating tab within the groove or slot.

In some embodiments, the panel 20 is a sandwich panel, sandwich structure or other type of composite structure. The panel 20 may be provided in a variety of geometries and dimensions to form frames or structures of various sizes depending on the particular application. The panel 20 may also provide certain properties, as desirable, for example, providing thermal insulation, sound reduction, and/or enhancing structural soundness. For example, the panel 20 may be provided with increased thickness to provide additional structural rigidity as needed in a particular application. However, the thicknesses of the panel 20 may be varied in order to optimize the structural capacity of the trailer frame 10, any desired insulating quality of the trailer frame 10 (i.e., thermal or noise reduction), and/or the overall weight of the trailer frame. Further, the thicknesses and/or density of the panel 20 may vary and/or taper over its length and/or width. In one example embodiment, the panel 20 has a thickness of 3 inches, a width of 96 inches, and a length of 300 inches; however, other dimensions may be utilized. In some embodiments, the panel 20 is provided as a standard size sheet material that may be cut down to size for a particular application by the equipment manufacturer and/or end-user.

The panel 20 may be made from any number of materials or layers of materials. The panel 20 may comprise, without limitation, solid laminates, fiber reinforced polymer materials, fiber reinforced polymer composites, a pultruded or vacuum-infused sandwich panel (e.g., a panel having upper and lower skins with a core there between), a pultruded panel (e.g., a panel having upper and lower skins with vertical or diagonal webs there between), or combinations thereof. In one example, the panel 20 comprises at least one top laminate (i.e., top skin), at least one bottom laminate (i.e., bottom skin), a core material between the top and bottom laminates, and a plurality of fibers (i.e., fiber reinforcing elements) that extend through the foam core and laminates, thereby interconnecting the laminates that are secured to opposing faces/surfaces of the core material. Where utilized, the core material of the panel 20 may comprise any number of materials, including without limitation, wood, foam, and various types of honeycombs, and combinations of the same. Laminates or skins, where utilized, may also comprise various materials, including but not limited to, resin materials, including without limitation, thermosetting resins. Thermosetting resins may include, without limitation, unsaturated polyesters, vinyl esters, polyurethanes, epoxies, phenolics, and mixtures thereof. The fiber reinforcing elements, where utilized, may be configured as 3-D fibers extending through the core material and may include, without limitation, E-glass fibers, S-glass fibers, carbon fibers, KEVLAR®, metal (e.g., metal nanofibers), high modulus organic fibers (e.g., aromatic polyamides, polybenzamidazoles, and aromatic polyimides) and/or other organic fibers (e.g., polyethylene and nylon), and whiskers and fibers constructed of boron, aluminum silicate, or basalt; however, blends and hybrids of such materials may also be used as a reinforcing element. In one example embodiment, the panel 20 is comprised of various layers of material, including without limitation E-glass, S-glass, carbon, balsa, polyurethane (PU) foam, metal foil sheet, foam insulating material, composite materials, and combinations thereof. In another exemplary embodiment, the panel comprises several layers of composite material forming a vacuum infused panel with an inner and outer E-glass skin material, a core material between the skins (e.g., PU foam), and one or more additional layers (e.g., foil layers) disposed between the inner and outer fiberglass skin.

In other embodiments, the panel 20 is a fiber reinforced polymer composite, for example, a composite sandwich panel. In one such embodiment, the panel is a TRANSONITE® composite panel, which may be customized depending on an intended end use. For example, the TRANSONITE® composite panel may include various core materials (e.g., foam, balsa, phenolic, etc.) with a wide range of fibers arranged therein in varying densities, and may also comprise various fabrics and resins for the composite skin(s).

FIG. 1 illustrates an isometric top view of a trailer frame 10, according to one or more embodiments. The trailer frame 10 may be towed by another vehicle (not illustrated) and may thus include a structure for interconnecting the trailer frame 10 to a tow vehicle such as, for example, an A-frame assembly 12. The trailer frame 10 may also include at least one axle assembly 14, having one or more wheels 15 rotatably attached thereto, and in some embodiments. Here, the trailer frame 10 includes a single axle assembly 14 with a pair of wheels 15 extending thereto, but in other embodiments a pair or more of axle assemblies 14 are utilized. Additionally, the trailer frame 10 may include a rear bumper assembly 16.

The trailer frame 10 may also include a panel 20. The panel 20 may be a sandwich material having a core 22, a top skin 24, and a bottom skin 26; however, the panel 20 may be differently configured as described above. In the illustrated embodiment, the panel 20 is configured as a horizontally oriented body or floor of the trailer frame 10 and includes a top side 20A and a bottom side 20B (see FIG. 3, below). Thus, in the illustrated embodiment, the top skin 24 defines the top side 20A of the panel 20 and the bottom skin 26 defines the bottom side 20B of the panel 20, with the core 22 being sandwiched between the top skin 24 and the bottom skin 26. Also in the illustrated embodiment, the trailer frame 10 includes a single panel 20 but, in other embodiments, additional panels may be utilized. For example, two or more of the panels 20 may be utilized to form the floor of the trailer frame 10. In addition to or in lieu of forming the floor of the trailer frame 10, one or more panels 20 may be utilized to form a wall, a ceiling, and/or a divider or partition.

In the depicted embodiment, the core 22 comprises a foam material and a plurality of fiber inserts; however, any number of differently configured and designed cores may be utilized. The core 22 may have properties that it imparts to the trailer frame 10, for example, providing structural rigidity to resist torque and other torsional forces, providing thermal or noise insulation, etc. Also in the illustrated embodiment, the top and bottom skins 24, 26 cover respective top and bottom planar surfaces of the core 22, and the top and bottom skins 24, 26 may operate to shield the core 22 from ambient conditions, weather, etc. The top and bottom skins 24, 26 may also provide other characteristics to the trailer frame 10, such as added structural rigidity, etc. In the illustrated embodiments, the top and bottom skins 24, 26 have exposed outer surfaces 24' and 26' (see FIGS. 3-6), respectively.

Figure 2:
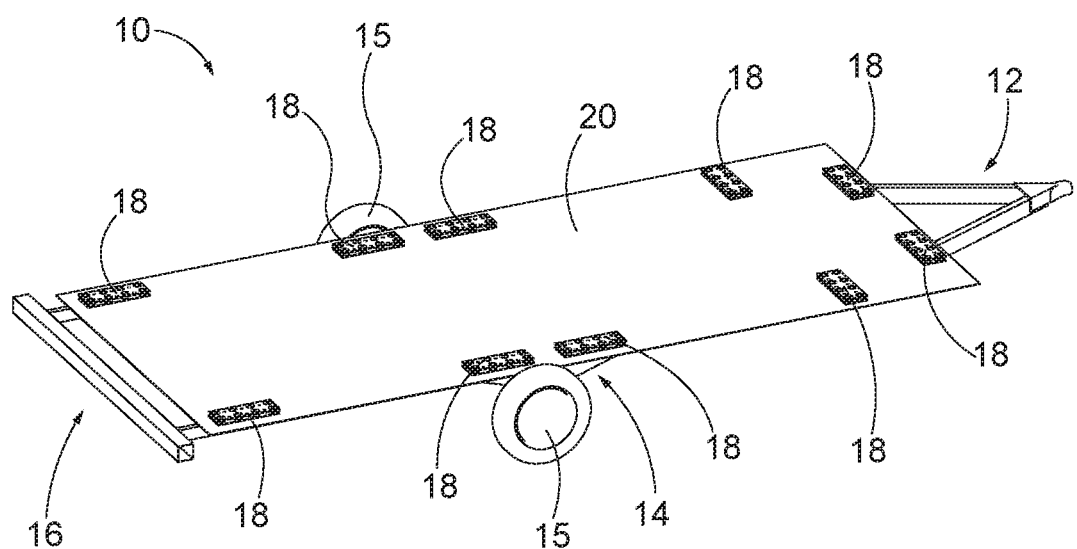
FIG. 2 is an exposed isometric top view of the trailer frame of FIG. 1.

FIG. 2 illustrates an isometric exposed view of the trailer frame 10 showing a plurality of hard points 18 arranged about the panel 20, according to one or more embodiments. The hard points 18 are locations at which external structures (e.g., the A-frame 12, the axle assembly 14, the rear bumper 16, etc.) are attached to the panel 20 and, in the illustrated embodiment, a hard point insert 30 (hereinafter, insert 30) may be arranged on or within the panel 20 at the hard point 18 locations to interconnect such external structures to the panel 20. In FIG. 2, the core 22, the top skin 24, and the bottom skin 26 of the panel 20 have been removed to illustrate an exemplary arrangement of the hard points 18 and the inserts 30. The trailer frame 10 may have any number of hard points 18.

Here, the trailer frame 10 includes a plurality of hard points 18 arranged about the panel 20, but in other embodiments, the trailer frame 10 includes more or less hard points 18. Also, in the illustrated embodiment, a single insert 30 is provided at each of the hard points 18; however, in other embodiments, more than one insert 30 may be provided at each h or hard point 18 location without departing from the present disclosure. Thus, the trailer frame 10 may include one or more hard points 18 having one or more inserts 30. As mentioned above, the hard points 18 may be configured as attachment points where external structures may be connected to the panel 20. The hard points 18 (and the inserts 30 there at) may be accessed from the top side 20A of the panel 20, the bottom side 20B of the panel 20, and/or both the top and bottom sides 20A,20B of the panel 20. Here, the A-frame 12, the axle assembly 14, and the rear bumper assembly 16 are each secured to the bottom side 20B of the panel 20 via the inserts 30 at the hard points 18. Also, any number of hard points 18 and inserts 30 may be utilized to secure the various structures. Here, a pair of hard points 18 each having one insert 30 are used to attach the rear bumper assembly 16 to the panel 20, whereas four (4) hard points 18 each having one insert 30 secure the axle assembly 14 to the panel and four (4) hard points 18 each having one insert 30 secure the A-frame assembly 12 to the panel 20. In other embodiments, more or less hard points 18 and inserts 30 may be utilized to secure any of the structures than as illustrated. For example, the hard points 18 may be configured as strips extending along lengths of the panel 20 where each strip includes a plurality of spaced inserts 30 or a single insert 30 having a similar length, and such embodiments would further modularity of the trailer frame 10. For example, each peripheral edge of the panel 20 may be configured as a hard point 18, with one or more inserts 30 extending therein.

Various methods or techniques may be utilized to secure the inserts 30 at the hard points 18. For example, the inserts 30 may be secured within the core 22, or may extend through the core 22 and sandwich the top and bottom skins 24, 26. In addition, the inserts 30 may be installed in, or integrally formed with, the panel 20 at the hard points 18 so as to facilitate attachment of external equipment/structures to the trailer frame 10, and these hard points 18 and inserts 30 may be organized and situated on the panel 20 in a multitude of different configurations depending on the application. Accordingly, the trailer frame 10 may be modular so that various equipment/structures may be attached thereto via the inserts 30 at any of the hard points 28. In some embodiments, this modularity is achieved by utilizing standardized mounting brackets each having one standardized face designed to attach to and mate with the inserts 30 and a second standardized face to which external equipment/ structures may be attached. In another embodiment, modularity is achieved by using mounting brackets each having a standardized first face that is similarly designed to attach to and mate with the inserts 30 secured to the panel 30, and a specially designed (i.e., non-standardized) second face that connects to a specific structure or a specific piece of equipment. In even other embodiments, the inserts 30 are not standardized, but are instead each uniquely designed to receive a specific structure or piece of equipment so that mounting brackets are not necessarily needed. For example, a first variety inserts (not illustrated) could be installed at certain hard point 18 locations to connect to the A-frame 12, a second variety of inserts (not illustrated) could be installed at certain hard point 18 locations to connect to the axle assembly 14, and a third variety of inserts (not illustrated) could be installed at certain hard point 18 locations to connect to the bumper assembly 16. In yet another embodiment, the various structures and external equipment/may include integral mounting brackets, and these integral mounting brackets of the structures or external equipment may be secured directly to or within the panel 20 so that such equipment/structures are integral with the trailer frame (not illustrated). For example, the A-frame 12 may include mounting brackets that are set within the core 22 of the panel rather than being connected to an inert 30 that is set within the core 22 of the panel 20.

The inserts 30 may be manufactured of any number of materials. For example, the inserts 30 may be manufactured from metals or alloys such as steel, titanium, aluminum, etc. In some embodiments, the inserts 30 may be made of polymer materials. Also, the inserts 30 may be further secured to or within the panel 20 via adhesives, such as, Lord Brand epoxy. Various types or styles of inserts 30 may be utilized in trailer frame 10 and different combinations of insert styles may be utilized without departing from the present disclosure. The inserts 30 may be located at various hard point 18 locations relative to the panel 20 (i.e., the inserts 30 may be located any various hard point 18 locations). However, in the illustrated embodiments, the inserts 30 are located so as to provide suitable mounting locations for structures and external equipment such as the A-frame 12, the axle assembly 14, and the rear bumper assembly 16. The inserts 30 further described below with reference to FIGS. 11-14.

Figure 3:
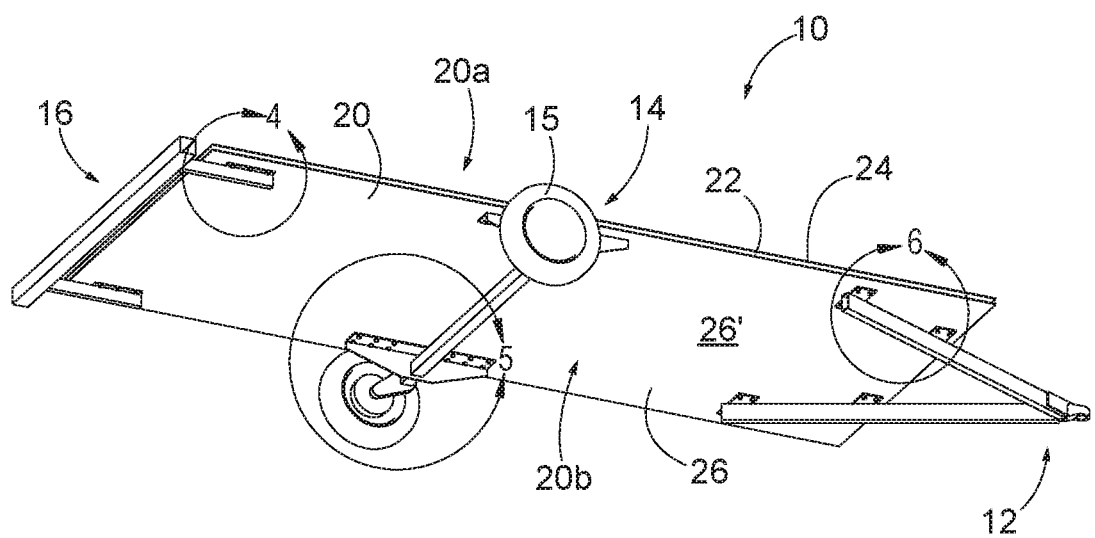
FIG. 3 is an isometric bottom view of the trailer frame of FIG. 1, and FIGS. 4-6 are various detailed isometric bottom views of FIG. 3.
Figure 4:
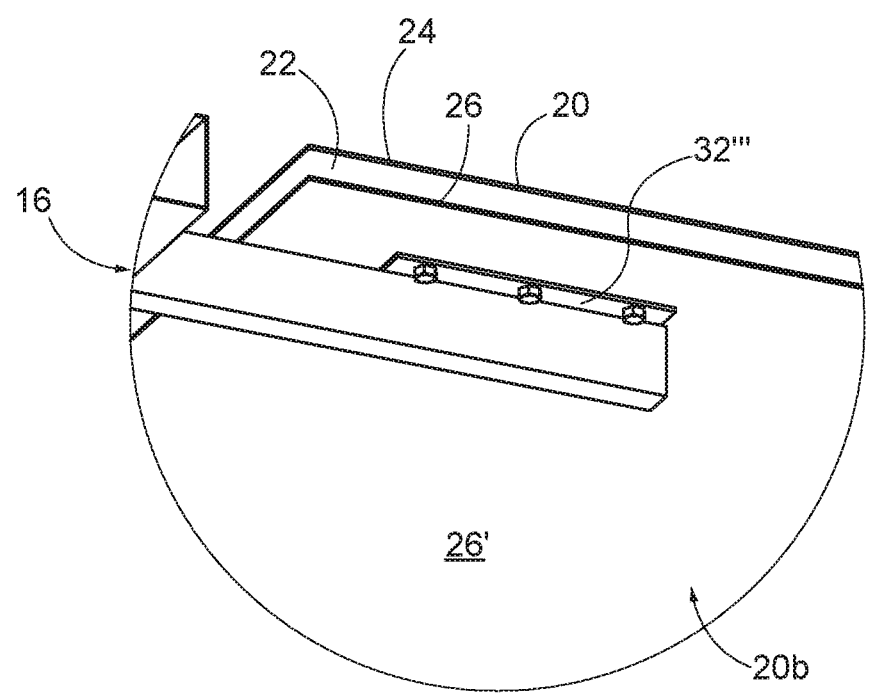
Figure 5:
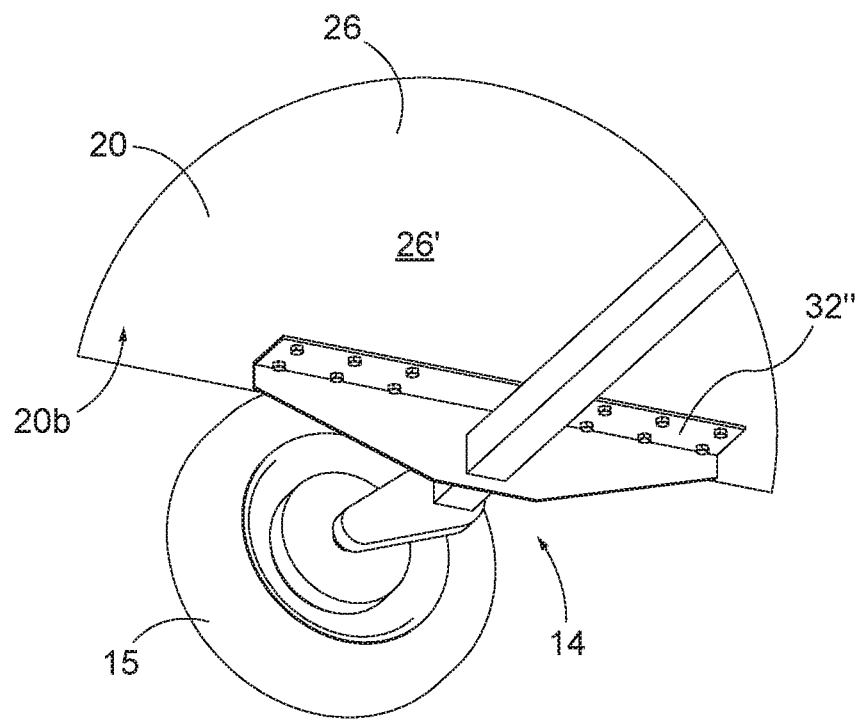
Figure 6:
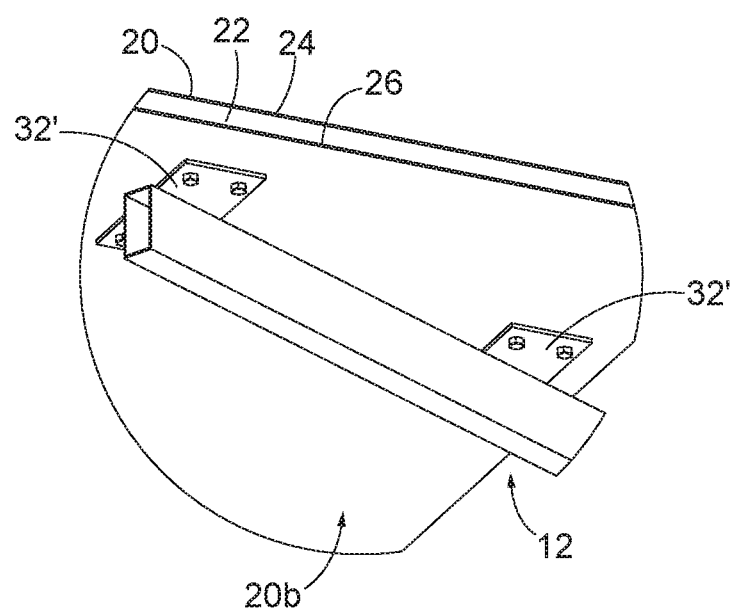

FIG. 3 illustrates an isometric bottom view of the trailer frame 10, according to one or more embodiments, whereas FIGS. 4-6 illustrated detailed isometric bottom views of FIG. 3. As illustrated in FIG. 6, the A-frame assembly 12 includes a plurality of first brackets 32' that each attach to the inserts 30 provided at corresponding hard point 18 locations. Also, the axle assembly 14 includes a plurality of second brackets 32" that each attach to the inserts 30 provided at corresponding hard point 18 locations as illustrated in FIG. 5. Similarly, FIG. 6 illustrates the rear bumper assembly 16 having a plurality of third brackets 32'" that each attach to the inserts 30 provided at corresponding hard point 18 locations. It will be appreciated, however, that the foregoing is one example and that any number of brackets may be utilized to secure the A-frame 12, the axle assembly 14, and the rear bumper assembly 16 to the panel 20, without departing from the present disclosure. For example, the A-frame 12 may include one or more first brackets 32' for mating to the panel 20; the axle assembly 14 may include one or more second brackets 32" for mating to the panel 20; and the rear bumper assembly 16 may include one or more third brackets 32'" for mating to the panel 20.

FIG. 7A illustrates a front side view of the trailer frame 10, according to one or more embodiments, whereas FIG. 7B illustrates various cross-sectional side views of the trailer frame 10 of FIG. 7A along section line D-D. In these figures, the core 22, the top skin 24, and the bottom skin 26 of the panel 20 are not illustrated to show an exemplary mounting of the inserts 30. Thus, FIGS. 7A-7B illustrate the top side 20A and the bottom side 20B of the panel 20, with inserts 30 secured there-between (at hard point 18 locations) for attachment to the A-frame 12, the axle assembly 14, and the rear bumper assembly 16. As illustrated in FIG. 10, one or more inserts 30 are provided at hard point 18 locations near a front end of the panel 20 for attachment to the first brackets 32' of the A-frame assembly 12. Also, one or more inserts 30 are provided at hard point locations near a middle section of the panel 20 for attachment to the second brackets 32" of the axle assembly 14, as illustrated in FIG. 9. Similarly, FIG. 8 illustrates one or more inserts 30 provided at hard point 18 locations near a rear end of the panel 20 for attachment to the third brackets 32''' of the rear bumper assembly 16. These structures (or any other structures to be attached to the panel 20) may be secured to the panel 20 at different locations. Thus, the inserts 30 may be differently located and installed at different ends or sections of the panel 20, without departing from the present disclosure. For example, the axle assembly 14 may be mounted to inserts 30 provided proximate to a front end and/or rear end of the panel 20, in addition to or in lieu of being provided at the middle section of the panel 20.

As mentioned above, the inserts 30 may have various configurations, for example a formed insert (see, e.g., FIGS. 11-12) or a solid insert (see, e.g., FIGS. 13-14). The inserts may be differently configured, however, without departing from the present disclosure.

FIGS. 11A-11D illustrate a formed insert 500 that may be incorporated into the trailer frame 10, according to one or more embodiments. The formed inserts 500 include a top and bottom surface, and a periphery there-between. In this example, the formed insert 500 includes a top assembly 510 and a bottom assembly 520 that define the top and bottom surfaces, respectively, and a periphery 516 extends around the formed insert 500 between the top and bottom assemblies 510, 520.

Also, the top and bottom assemblies 510, 521 are joined by columns 530 that provide structural rigidity to the formed insert 500 and interconnect the top and bottom assemblies 510, 520. In this embodiment, the top and bottom assemblies 510, 520 are plates that each have an outer surface 512, 522 and an inner surface 514, 524. Here, either or both of the top and bottom assemblies 510, 520 include one or more protrusions 540 that are formed into the outer surfaces 512, 522, and extend through the plates of the top and bottom assemblies 510, 520, and beyond the inner surface 514, 524 thereof to define one or more extensions 542. The protrusions 540 and the extensions 542 may have various geometries, for example, conical shapes. The protrusions 540 and the extensions 542 of the top assembly 510 correspond with the protrusions 540 and the extensions 542 of the bottom assembly 520, and, when the corresponding protrusions 540 (and the corresponding extensions 542) of the top and bottom assemblies 510, 520 are joined, form the columns 530 that secure the top and bottom assemblies 510, 520 together. The columns 530 formed by the extensions 542 may also define attachment or anchor points that include an hole or channel 550 formed or extruded there-through, and such channels 550 may be tapped to receive a threaded fastener. In some embodiments, the channel 550 is arranged to receive a bushing or threaded bushing.

As mentioned, the top and bottom assemblies 510, 520 of the formed insert 500 may each include one or more protrusions 540 extending therefrom that mate with a corresponding protrusion 740 formed into the other of the bottom or top assembly 520, 510. The protrusions 540 may be formed by protruding material from the outer surfaces 512, 522 thereof into and through the inner surface 514, 524 thereof. In the illustrated embodiment, the protrusions 540 are frusto-conical protrusions that extend through and past the inner surfaces 514, 524; however, protrusions 540 may have different geometries. the top and bottom assemblies 510, 520 may be secured together by joining corresponding protrusions 540. Once joined, each pair of corresponding protrusions 740 mate together to define the columns 530 that provide structural support and/or rigidity to the formed inserts 500. In one embodiment, the columns 530 are formed when the protrusions 540 of the top assembly 510 are joined with the protrusions 540 of the bottom assembly 520 via press-fitting; however, the top and bottom assemblies 510, 520 may be differently joined as known in the art, for example, via welding, adhesives, fasteners, etc. In another embodiment, the protrusions 540 of the top assembly 510 are joined with the protrusions 540 of the bottom assembly 520 by adhesive, and the columns 530 defined thereby include the channels 550 that may tapped or threaded to receive a fastener, including bot not limited to a bolt or screw. In other embodiments, however, channel 550 is not tapped. In even other embodiments, the channel 550 is given certain characteristics; for example, a locking agent or locking collar (not depicted) may be provided in channel 550 to help secure a fastener therein or otherwise inhibit backing out of the same.

Figure 11B:
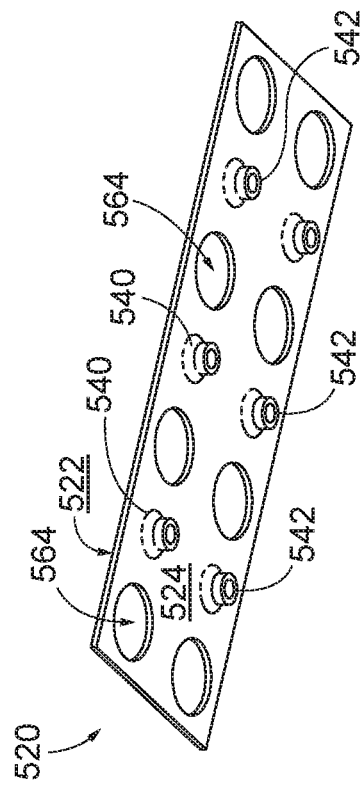
FIGS. 11A and 11B are isometric top and bottom views, respectively, of a hard point insert assemblies that may be utilized with the trailer frame of FIG. 1, according to one or more embodiments.
Figure 11D:
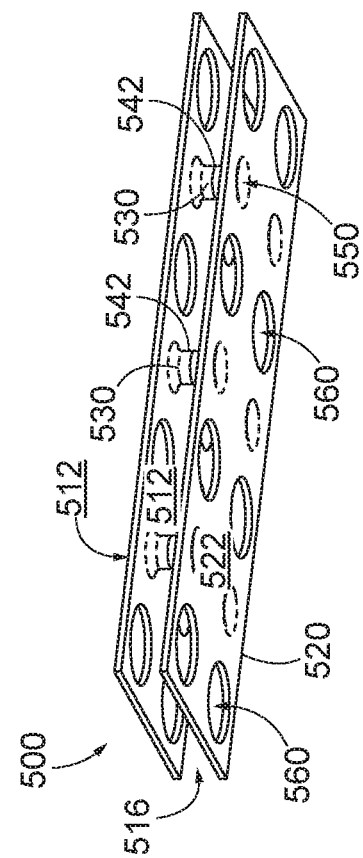
FIGS. 11C and 11D are isometric top and bottom views, respectively, of the hard point insert assemblies of FIGS. 11A-11B when assembled into inserts, according to one or more embodiments.
Figure 11A:
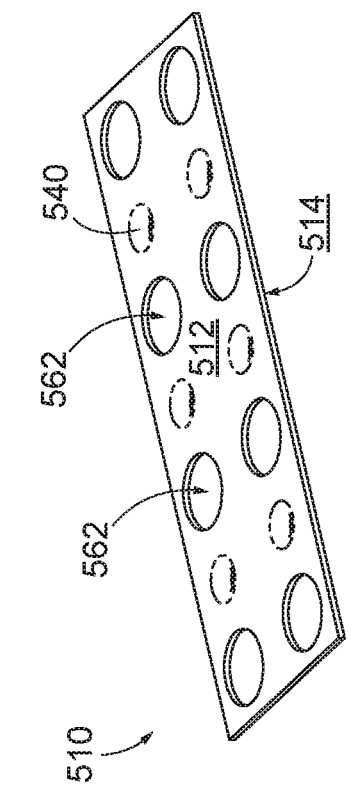
Figure 11C:
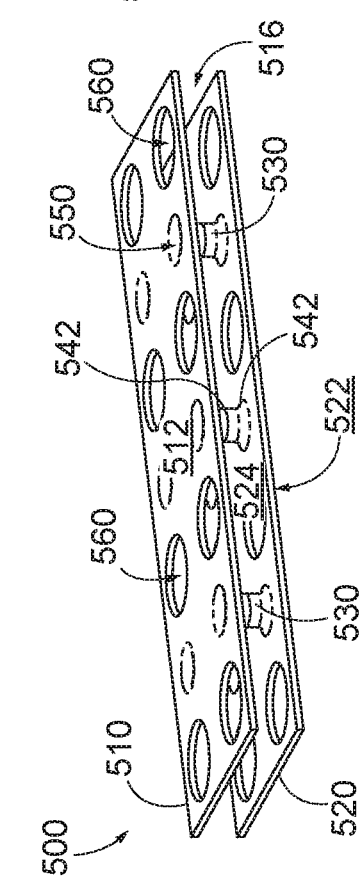

As illustrated in FIGS. 11A-11D, the formed insert 500 may also comprise a plurality insert recesses 560 that extend through the formed insert 500 and may facilitate locking and/or securing, for example, within the panel 20. With reference to FIGS. 11A and 11B, an embodiment is illustrated where the top assembly 510 and the bottom assembly 520 each comprise recesses 562, 564, respectively. As illustrated in FIGS. 11C-11D, the recesses 562, 564 correspond with each other such that corresponding pairs of the recesses 562, 564 form the insert recesses 560 when the top assembly 510 and bottom assembly 520 are joined with their respective recesses 562, 564 aligned on top of each other an. Accordingly, each insert recess 560 may be defined by the top recess 562 and the bottom recess 524 when top and bottom assemblies 510 and 520 are secured together, and the recesses 560 extend through the formed insert 500 (or any other type of insert) so as to form a connecting channel through the insert 500.

FIGS. 12A-12D illustrate various views of the formed insert 500 installed within an exemplary panel 600, according to one or more embodiments. In these embodiments, the exemplary panel 600 includes a core 602, a top skin 604, and a bottom skin 606. Here, the core 602 includes a plurality of fibers 603 and a foam or other material provided between the fibers 603 (not illustrated). With regard to the panel 600, in FIG. 12A, the top skin 604 and the foam of the core 602 are not illustrated, whereas FIGS. 12B-12D illustrate the top skin 604, the bottom skin 606, and the fibers 603 extending there-between, but no foam in the core 602. FIG. 12B also illustrates a fastener 608 extending through the bottom skin 606 and into one of the channels 550 of the formed insert 500. The fastener 608 may include various fasteners as known in the art. The fastener 608 may extend through the panel 600 and the formed insert 500 therein to extend beyond the top skin 604 such that another object (e.g., a washer, nut, etc.) is fastened to an opposing end of the fastener 608 (not illustrated). Thus, while each of FIGS. 12A-12D depicts the formed insert 500 being positioned within the core 602 of the panel 600, the top skin 604 is not illustrated in FIG. 12A so as to expose at least the upper surface of formed insert 500 and the upper ends of the fibers 603 that extend upward from the bottom skin 606, and the foam has not been illustrated in any of the figures to expose the fibers 603. Thus, in FIGS. 12A-12D, portions of the core 602 are not depicted so as to provide unobstructed views of the illustrated components.

FIGS. 12C-12D depict front and side cutaway views of the formed insert 500 when installed in the exemplary sandwich panel 600. These views illustrate how the top and bottom assemblies 510, 520 provide the rigid surfaces and/or anchoring points that resist compression, deformation, and/or other forces from equipment and/or structures attached thereto. For example, when the fastener 608 is utilized, the top and bottom assemblies 510, 520 bear the compression forces imparted by the fastener 608 (rather than the panel 600), so that the core 602 is not compressed and so that the top and bottom skins 604,606 don't bottom out against each other.

As previously described, top and bottom recesses 562, 564 together define the recesses 560. The recesses 560 extend through the insert 500 and open at the interior faces of the top and bottom skins 604,606 so as to form a channel that connects the top and bottom skins 604, 606 such that the core 602 may extend there-though. Here, the recesses 560 are closed, meaning they extend through central regions of the insert 500 to receive portions of the core 602 (e.g., the fibers 603). In other embodiments, however, the recesses 560 could be differently configured, for example, as open recesses that border the periphery or edge of the insert 500 and thus are open to receive the core 602 that surrounds the insert 500; and in even other embodiments, both types of the recesses 560 may be utilized. In addition to reducing the overall weight of trailer frame 10, the recesses 560 permit the core 602 materials (e.g., the fibers 603, foam, etc.) to extend through and lock the formed insert 500 within the panel 600. Accordingly, hard point inserts may be integrally locked or secured to and/or within a panel. For example, installation of the formed insert 500 having one or more recesses 560 permits the core 602 material (e.g., the fibers 603, foam and other materials) to extend through the formed insert 500 at locations defined by its recesses 560 (see FIG. 12A). Not only does this configuration operate to secure each of the formed insert 500 with respect to the panel 600, but also increases the amount of the formed insert's 600 surface area that is exposed to, or in contact with, the interior of the panel 600 (i.e., the core 602). This added surface area exposure enhances the effectiveness of adhesives (or other bonding agents) when poured over the formed insert 500 and/or within its recesses 560 to bond the formed inserts 500 to the panel 600.

Removal of the panel's 600 top and/or bottom skins 604, 606, or a portion thereof, may facilitate installation of a hard point insert, such as the formed insert 500, therein. In FIG. 12A, top skin 604 has been removed from panel 600 at a hard point location to expose at least a portion of the core 602, and a cavity or pocket (not illustrated) may be formed in the core 602 at this hard point location so as to receive the top or bottom assembly 510, 520. This same process may be performed with respect to the bottom skin 606 to facilitate similar installation of the bottom or top assembly 520, 510. However, where panel 600 comprises sufficiently thick skins (e.g., front and bottom skins 604, 606), the pockets or recesses (not depicted) may be formed just within the thickness of skins but do not extend through the skin and into the core 602 itself. Regardless, the pockets formed by removing portions of the skins 604,404 and/or core 602 may have the same or similar dimensions as the top and/or bottom insert assembly 510, 520. Adhesive and/or other materials may then be poured over top and bottom assemblies 510, 520 and within recesses 560 to lock and secure formed inserts 500 to the panel 600.

The trailer frame 10 utilizing formed hard point inserts, such as the formed inserts 500, may be manufactured in a variety of ways. In one method, formed inserts are set and installed within the core of a panel during manufacture (of the panel), and then together laminated in the manufacturing process to form a panel with integral hard points. In another method, pockets are machined into the surfaces of an already manufactured panel to receive the hard point plates. For example, once the hard point locations are identified, appropriately dimensioned pockets may be formed at those locations by removing at least some amount/thickness of the top and bottom skins 604, 606 at those locations, as well as the underlying core 602 in embodiments where relatively thin top and bottom skins 604, 606 are utilized. In one embodiment, a CNC router is used to create the shallow pockets in the shape of top or bottom assembly 510, 520; however, other manufacturing techniques and tools may be utilized. These shallow pockets may be similarly dimensioned as to the top and/or bottom assemblies 510, 520, and in some such embodiments portions of panel 600 residing under recesses 562, 564 are not removed so that top and bottom assemblies 510, 520 may be set within the pockets while being flush with the exterior panel faces, and so that panel's 600 core 602 material (e.g., fibers 603) extends into recesses 562, 564 to provide added stability as described above. These shallow pockets may also be formed or machined to include additional portions of core 602 material that extends through the thickness of the panel 600, for example, to receive and extend through conical protrusions such as the channels 550 of the columns 530. Once those pockets are formed, the top and bottom assemblies 510, 520 may be driven into their respective top and bottom panel surfaces until mating protrusions 540 of the top and bottom assemblies 510, 520 meet (thereby forming the columns 530). Adhesive may then be utilized to further secure the formed insert 500 within the panel 600. Moreover, this adhesive may form a layer over the exposed hard point front and bottom assemblies 510, 520, and effectively replace the portions of the top and bottom skins 604,606 that were previously removed. Accordingly, adhesives and/or other materials may be used to reform and/or to replace the previously removed top and bottom skins 604, 606 so that the formed insert 500 may be fully covered, insulated, or otherwise shielded from ambient conditions. In other embodiments, however, the previously removed top and bottom skins 604, 606 may not be replaced or reformed and the formed inserts 500 are instead exposed to ambient conditions.

Figure 13B:
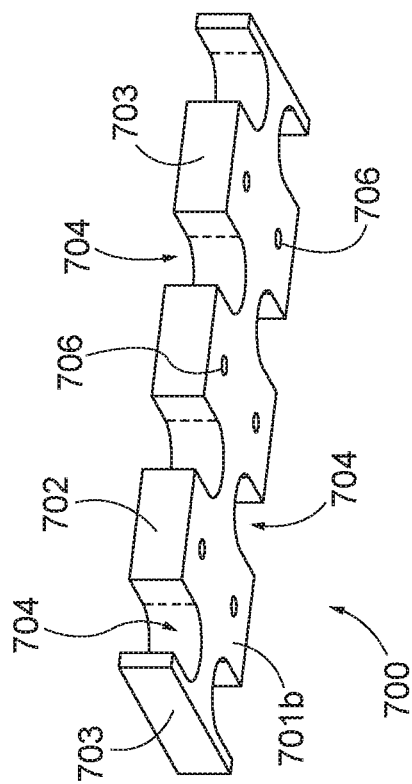
FIGS. 13A-13B are isometric top and bottom views, respectively, of another type of hard point insert that may be utilized with the trailer frame of FIG. 1, according to one or more embodiments.
Figure 13A:
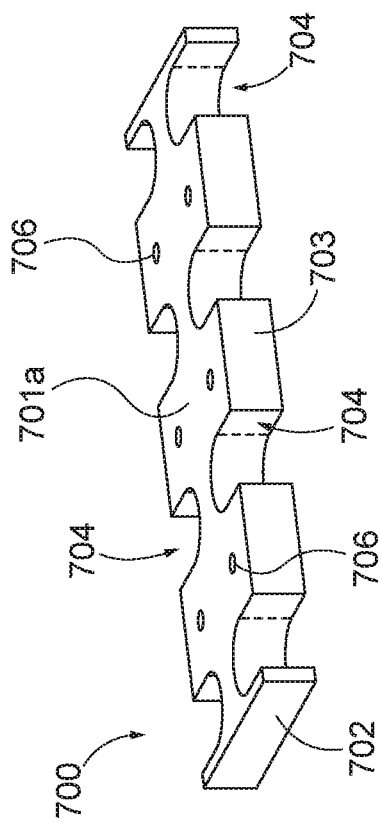

Other types of inserts may be utilized in addition to or instead of the formed inserts 500. For example, FIGS. 13A-13B illustrate an embodiment of a solid insert 700 that may be utilized with the trailer frame 10, according to one or more embodiments. Here, the solid inserts 700 include a body 702 that may be made from a solid, unitary piece of material. The solid insert 700 may thus be made from unitary construction design such that all aspects thereof form a single structure, e.g., the body 702, which is a unibody or unitary body that defines all sides of the insert 700 (i.e., the top, bottom, and periphery). However, in other embodiments, the body 702 of the solid insert 100 may be made from numerous pieces of material and then secured together to form structure or unibody. Regardless of whether formed from a single piece of solid material or numerous pieces of solid materials, the body 702 will be integral body that may be machined or milled with recesses and/or channels as hereinafter described.

Here, the body 702 includes a top and bottom surface 701A, 701B, respectively, as well as a periphery 703 extending around the body 702 between the top and bottom surfaces 701A, 701B. The solid insert 700 may include one or more recesses 702 formed through the body 702 and through which the core of a panel may extend as described above. Here, the recesses 704 are cut in at the edges or the periphery 703 of the body 702 and resemble half circular cut-outs. The recesses 704, however, may be differently arranged through central regions of the body 702 that do not border the edges of the body (e.g., circular holes extending through the top and bottom surface of the body 702), or the recesses 704 may be positioned both along the edges (as illustrated) and through central regions of the body 702. Moreover, the recesses 704 may have various other geometries instead of, or in combination with, the half circular cut-outs (as illustrated) and/or the circular holes. The solid inserts 700 may also include channels 706 that may receive anchoring elements such as a bolts, screws, or other fasteners as known in the art. In some embodiments, channels 706 are tapped.

FIGS. 14A-14D illustrate various views of the solid insert 700 installed within the exemplary panel 600, according to one or more embodiments. In FIG. 14A, the top skin 604 and the foam of the core 602 are not illustrated, whereas FIGS. 14B-14D illustrate the top skin 604, the bottom skin 606, and the inserts 603 extending there-between, but no foam in the core 602. FIGS. 14B-14D also illustrates a fastener 808 extending through the bottom skin 606 and into one of the channels 706 of the solid insert 700. The fastener 808 may include various fasteners as known in the art. The fastener 808 may extend through the panel 600 and the solid insert 700 therein to extend beyond the top skin 604 such that another object (e.g., a washer, nut, etc.) is fastened to an opposing end of the fastener 808 (not illustrated). Thus, while each of FIGS. 14A-14D depicts the solid insert 700 being positioned within the core 602 of the panel 600, the top skin 604 is not illustrated in FIG. 14A so as to illustrate at least an upper surface 802 of solid insert 700 and the upper ends of the fibers 603 that extend upward from the bottom skin 606, and the foam has not been illustrated in any of the figures to expose the fibers 603. Thus, in FIGS. 14A-14D, portions of the core 602 are not depicted so as to provide unobstructed views of the illustrated components. FIGS. 14C-14D depict front and side cutaway views of the solid insert 700 when installed in the exemplary sandwich panel 600. These views illustrate how the body 702 of the solid insert 700 provides the rigidity and structure against the top and bottom skins 604, 606 and/or anchoring points that resist compression, deformation, and/or other forces from equipment and/or structures attached to the panel 600. For example, when the fastener 808 is utilized, the body 702 bears the compression forces imparted by the fastener 808 (rather than the panel 600), so that the core 602 is not compressed and so that the top and bottom skins 604, 606 don't bottom out against each other.

A trailer frame utilizing the solid insert 700 may also be manufactured in a variety of ways. For example, all or some portion of the top skin and/or bottom skin 604, 606 of the panel 600 may be removed at one or more hard point locations on the panel's 600 planar surface where external equipment or componentry is to be mounted. In addition to removing either or both of the skins 604, 606, the panel's 600 core 602 at those locations may be removed to form pockets that are appropriately dimensioned to receive each hard point, such as the body 702 of the solid insert 700 with the cutouts or recesses 704. Accordingly, each void defined by such pockets may be identically dimensioned to the solid insert 700 that is received therein. These pockets may be formed by any number of methods, for example, by routing, and these pockets facilitate secure installation of solid hard points. Once the pocket is created, the body 702 of the solid insert 700 may be inserted therein from either the front or back surface of the panel 600, such that the panel's 600 core 602 material fills the recesses 704 of the solid insert 700 so as to form interlocking pillars as previously discussed. Thereafter, adhesive may be utilized to further secure the solid insert 700 within the panel 600, and this adhesive may also replace the previously removed top and/or bottom skin 604, 606 of the panel 600. This is just one example, however, and other manufacturing means may be employed.

As used herein, spatially orienting terms such as "above," "below," "upper," "lower," "inner," "outer," "right," "left," "vertical," "horizontal," "top," "bottom," "upward," "downward," "laterally," "upstanding," et cetera, can refer to respective positions of aspects as shown in or according to the orientation of the accompanying drawings. "Inward" is intended to be a direction generally toward the center of an object from a point remote to the object, and "outward" is intended to be a direction generally away from an internal point in the object toward a point remote to the object. Such terms are employed for purposes of clarity in describing the drawings, and should not be construed as exclusive, exhaustive, or otherwise limiting with regard to position, orientation, perspective, configuration, and so forth.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above-described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A trailer frame comprising:
    a trailer floor comprising a panel having a top skin, a bottom skin, and a core between the top skin and the bottom skin, wherein the top skin defines a top surface of the panel and the bottom skin defines a bottom surface of the panel; and
    at least one insert integrally arranged within the core of the panel between the top skin and the bottom skin, the insert having at least one attachment point that is accessible through the top surface and the bottom surface of the panel;
    wherein the at least one insert comprises a top plate and a bottom plate, and a plurality of columns connect an inner surface of the top plate to an inner surface of the bottom plate.

2. The trailer frame of claim 1, wherein the core includes a plurality of fibers that interconnect the top skin and the bottom skin, and at least a portion of the fibers extend through one or more recesses of the at least one insert.

3. The trailer frame of claim 2, wherein the one or more recesses extend through the insert at interior locations thereof that are inward of a periphery of the insert.

4. The trailer frame of claim 3, further comprising at least one second recess that extends through the insert at the periphery and opens outward of the insert.

5. The trailer frame of claim 2, wherein the one or more recesses extend through the insert at a periphery of the insert and open outward of the insert.

6. The trailer frame of claim 1, wherein the at least one attachment point includes a channel for receiving a fastener.

7. The trailer frame of claim 6, wherein the channel is threaded.

8. The trailer frame of claim 1, wherein the top and the bottom plates each have a plurality of protrusions extending from the inner surfaces thereof, and wherein the protrusions extending from the inner surface of the top plate each correspond with and are attached to a respective one of the protrusions extending from the inner surface of the bottom plate and thereby defining the plurality of columns.

9. The trailer frame of claim 1, wherein the attachment point is a channel extending into at least one of the columns, where the channel is configured to receive a fastener.

10. The trailer frame of claim 9, wherein the channel includes a pair of open ends that abut the top and bottom skins of the panel.

11. The trailer frame of claim 1, wherein the at least one insert includes one or more recesses extending through the top and the bottom plate and between the inner surfaces thereof, and wherein the core includes a plurality of fibers that interconnect the top skin and the bottom skin, and at least a portion of the fibers extend through the one or more recesses.

12. The trailer frame of claim 1, wherein the at least one attachment point is a hard point extending continuously between the top skin and the bottom skin.

13. The trailer frame of claim 1, wherein the at least one attachment point inhibits compression of the core.

14. The trailer frame of claim 1, wherein the at least one insert inhibits compression of the top and bottom skins towards each other.

15. The trailer frame of claim 1, wherein the at least one insert includes a pair of plates rigidly secured relative to each other in alignment with the top surface and the bottom surfaces of the panel.

16. The trailer frame of claim 1, wherein the at least one attachment point is configured to support the top and bottom surfaces against compression.

17. The trailer frame of claim 1, wherein the at least one attachment point is integrally formed within the insert associated with it.

18. The trailer frame of claim 1, further comprising an axle assembly attached to the panel at the at least one attachment point.

19. The method of manufacturing a trailer frame comprising:
    providing a trailer floor comprising a panel having a core surrounded by a top skin and a bottom skin;
    forming at least one pocket in the panel by removing a top skin portion from the top skin to expose a top pocket and removing a bottom skin portion from the bottom skin to expose a bottom pocket;
    setting a top plate of an insert in the top pocket, setting a bottom plate of the insert in the bottom pocket, and attaching the top plate and the bottom plate together, and
    securing the top plate and the bottom plate together to thereby define the insert within the panel, wherein the insert comprises at least one hard point rigidly extending between the top and the bottom skin to counter compression.

20. The method of manufacturing according to claim 19, wherein the method further comprises replacing the top and bottom skin portions to the top or bottom skin after securing the top and bottom plates together.

21. The method of manufacturing a trailer frame according to claim 19 further comprising attaching an axle assembly to the insert having at least one attachment point that is accessible through the top surface and the bottom surface of the panel.

22. A trailer frame comprising:
    a trailer floor comprising a panel defining a top planar surface and a bottom planar surface; and
    at least one insert arranged within a core of the panel, the insert having at least one attachment point extending continuously between the top and bottom planar surfaces, wherein the at least one attachment point is configured to support the top and bottom planar surfaces against compression, and wherein the at least one insert comprises a pair of rigidly connected plates joined by corresponding protrusions.

23. The trailer frame of claim 22, wherein the at least one attachment point is integral with the insert associated therewith.

24. The trailer frame of claim 22, further comprising an axle assembly attached to the panel at the at least one attachment point.

* * * * *